(12) United States Patent
Bennett et al.

(10) Patent No.: US 11,840,330 B2
(45) Date of Patent: Dec. 12, 2023

(54) DOWNSTOP LOAD SENSING SYSTEM

(71) Applicant: TEXTRON INNOVATIONS INC., Providence, RI (US)

(72) Inventors: Evan Butler Bennett, Fort Worth, TX (US); George Ryan Decker, Loveland, CO (US); Thomas Earl Johnson, Dallas, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 226 days.

(21) Appl. No.: 17/183,510

(22) Filed: Feb. 24, 2021

(65) Prior Publication Data

US 2022/0266997 A1    Aug. 25, 2022

(51) Int. Cl.
*B64C 29/00* (2006.01)
*B64C 19/00* (2006.01)

(52) U.S. Cl.
CPC .......... *B64C 29/0033* (2013.01); *B64C 19/00* (2013.01)

(58) Field of Classification Search
CPC .................................................. B64C 29/0033
See application file for complete search history.

(56) References Cited

U.S. PATENT DOCUMENTS

| | | | |
|---|---|---|---|
| 6,220,545 B1 | 4/2001 | Fenny et al. | |
| 8,033,500 B1* | 10/2011 | Charafeddine | ........... B64C 9/02 244/99.2 |
| 10,913,542 B2 | 2/2021 | King et al. | |
| 2009/0183561 A1 | 7/2009 | Gregory et al. | |
| 2013/0105637 A1* | 5/2013 | Stamps | ................. B64C 27/605 244/76 R |
| 2016/0109310 A1 | 4/2016 | McILravey | |
| 2020/0031488 A1 | 1/2020 | King et al. | |
| 2020/0039642 A1 | 2/2020 | Kooiman et al. | |

FOREIGN PATENT DOCUMENTS

| | | |
|---|---|---|
| GB | 1 577 341 A | 10/1980 |
| GB | 2 352 840 A | 2/2001 |

OTHER PUBLICATIONS

European Patent Office, "European Search Report," EP Application No. 21213988.5, dated May 20, 2022, 4 pages, published Munich, Germany.
European Patent Office, "European Search Report," EP Application No. 21213988.5, dated Jun. 15, 2022, 10 pages, published Munich, Germany.

* cited by examiner

*Primary Examiner* — Tien Q Dinh
*Assistant Examiner* — William L Gmoser
(74) *Attorney, Agent, or Firm* — Fogarty LLP (57) ABSTRACT

Embodiments are directed to a tiltrotor aircraft having a wing, a proprotor pivotably mounted on the wing, and a downstop striker attached to the proprotor using a load pin, wherein the load pin is configured to generate an output signal representing a force between the proprotor and the wing. A downstop mounted on the wing is aligned to be in contact with the downstop striker when the proprotor is in a horizontal position. A conversion actuator moves the proprotor between a horizontal position and vertical position. A flight control computer is coupled to the output signal from the load pin and configured to control the conversion actuator, wherein the flight control computer is configured to cause the conversion actuator to increase the force if the force is less than a first selected preload value or to decrease the force if the force is greater than a second selected preload value.

21 Claims, 10 Drawing Sheets

FIG. 7 ns
DOWNSTOP LOAD SENSING SYSTEM

STATEMENT REGARDING FEDERALLY SPONSORED RESEARCH OR DEVELOPMENT

This invention was made with Government support under Contract number: Base Agreement 2020-318, Delivery Order Number: AMTC 19-08-006 awarded by the Army Contracting Command-Redstone Arsenal. The Government has certain rights in this invention.

BACKGROUND

Tiltrotor aircraft are hybrids between traditional helicopters and traditional propeller driven aircraft. Typical tiltrotor aircraft have fixed wings that terminate with convertible tiltrotor assemblies that house the engines and transmissions that drive the rotors. Tiltrotor aircraft are convertible from a helicopter mode, in which the tiltrotor aircraft can take-off, hover, and land like a helicopter, to an airplane mode, in which the tiltrotor aircraft can fly forward like a fixed-wing aircraft.

The design of tiltrotor aircraft poses unique problems not associated with either helicopters or propeller driven aircraft. In particular, certain loads, both static and dynamic, must be carried by the wings of tiltrotor aircraft that are not present in either helicopters or fixed wing aircraft. When the tiltrotor aircraft converts to the airplane mode, certain oscillatory vibration loads, such as longitudinal pitch loads and lateral yaw loads, are created by the rotors. Because of these unique airplane-mode loads, if a minimal structural stiffness is not maintained between the tiltrotor assembly and the wing, then the aircraft will become unstable. This minimal structural stiffness is based upon airplane-mode aircraft speed and related load factors.

Attempts have been made to measure and maintain a selected preload between the tiltrotor assembly and the wing while the tiltrotor aircraft is in the airplane mode, but none have adequately resolved the problem. For example, in some tiltrotor aircraft, the preload between the tiltrotor assembly and the wing is inferred using differential pressure transducers integral to the conversion actuator motor to determine the preload between the tiltrotor assembly and the wing. In these applications, the preload between the tiltrotor assembly and the wing can be set, but with only limited accuracy. In other tiltrotor assemblies, strain gauges used to provide a direct preload measurement. Such systems are undesirable in certain applications because the strain gauges are required to be bonded to the structure for installation, which reduces maintainability as the sensors are difficult to replace or calibrate. Accordingly, the problem of sensing and measuring the preload between a tiltrotor downstop assembly and a wing has not been adequately resolved.

SUMMARY

Embodiments are directed to the integration of a load cell or load pin into a downstop striker structure. This also for the direct measurement of the downstop preload force in a sensor that lends itself well to maintainability.

A tiltrotor aircraft comprises a proprotor pivotably mounted on a wing. The proprotor is configured to move between a vertical position and a horizontal position. In one embodiment, a downstop striker is mounted to a proprotor gearbox and a downstop is mounted on the wing. In another embodiment, the downstop striker is mounted on the wing and the downstop is mounted on the proprotor gearbox. In both configurations, the downstop striker is configured to contact the downstop when the proprotor is rotated to the horizontal position. The downstop striker may comprise a load pin, wherein the load pin is configured to generate an output signal representing a force between the proprotor and the wing when the downstop striker contacts the downstop. Alternatively, the downstop may be mounted on a load cell that is configured to generate an output signal representing the force between the proprotor and the wing. The tiltrotor aircraft further comprises a conversion actuator configured to move the proprotor between a horizontal position and vertical position, and a flight control computer coupled to the output signal from the load pin or load cell. The flight control computer is configured to control the conversion actuator, wherein the flight control computer implements a closed loop control system using the conversion actuator to apply force and set a desired preload value as measured by the load pin.

The conversion actuator is attached to the wing and is mechanically coupled to the proprotor. The downstop striker comprises a first end configured to be received in a downstop, and a mounting hole extending through the downstop striker, wherein the load pin is positioned within the mounting hole.

The tiltrotor aircraft may further comprise a downstop striker fitting attached to the proprotor gearbox. The downstop striker fitting comprises an open area adapted to receive the downstop striker. The open area is defined by a first surface having a first mounting hole and a second surface having a second mounting hole. The downstop striker comprises a third mounting hole extending through the downstop striker. The load pin comprises a first end, a second end, and a middle section. The first end is positioned within the first mounting hole, the second end is positioned in the second mounting hole, and the middle section is positioned within the third mounting hole.

In another embodiment, an apparatus for maintaining a selected preload comprises an actuator for creating a force between a first member and a second member, wherein the first member and the second member are configured to pivot relative to each other. The force created by the actuator generates the selected preload between the members. A downstop striker is attached to the first member. A downstop is attached to the second member and is configured to receive the downstop striker. A load pin attaches the downstop striker to the first member. The load pin is configured to generate a signal representing the preload force. The signal may be a DC voltage, AC voltage, or digital signal, for example, and may be proportional to the force measured by the load pin. In another embodiment, the downstop is mounted on a load cell that generates the signal representing the preload force.

The apparatus may further comprise a microprocessor coupled to the load pin or load cell to interpret the signal. The microprocessor processes the signal and implements a closed loop control system using the conversion actuator to apply force and set a desired preload value as measured by the load pin. The microprocessor may be a flight control computer, and the actuator may be a conversion actuator for a tiltrotor aircraft.

The first member may be a proprotor, and the second member may be a wing on a tiltrotor aircraft. The actuator may be a conversion actuator for a tiltrotor aircraft.

Alternatively, the first and second members may comprise an airframe of a tiltrotor aircraft, and a tiltrotor assembly.

In a further embodiment, a method comprises providing an actuator for pivoting a tiltrotor assembly relative to a wing member and disposing a downstop assembly between the tiltrotor assembly and the wing member. The downstop assembly comprises a downstop and downstop striker. The downstop striker may be coupled to the tiltrotor assembly or the wing member using a load pin. Alternatively, the downstop may be coupled to the tiltrotor assembly or the wing member using a load cell. The load pin or load cell are electrically coupled to a microprocessor. The tiltrotor assembly is pivoted relative to the wing member with the actuator, which creates a force between the tilt rotor assembly and the at least one wing member. Pivoting the tiltrotor assembly may comprise, for example, moving the tiltrotor assembly between an airplane mode position and a helicopter mode position. The force in the downstop assembly is sensed using the load pin or load cell, which generates a corresponding signal that is received at the microprocessor. Dynamic loads generated during flight may increase or decrease the force.

The method may further comprise interpreting the signal with the microprocessor and sending a control signal from the microprocessor to the actuator in response to the signal.

The method may further comprise increasing the force with the actuator if the force is less than a first selected preload and decreasing the force with the actuator if the force is greater than a second selected preload.

BRIEF DESCRIPTION OF THE DRAWINGS

Having thus described the invention in general terms, reference will now be made to the accompanying drawings, which are not necessarily drawn to scale, and wherein:

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DETAILED DESCRIPTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
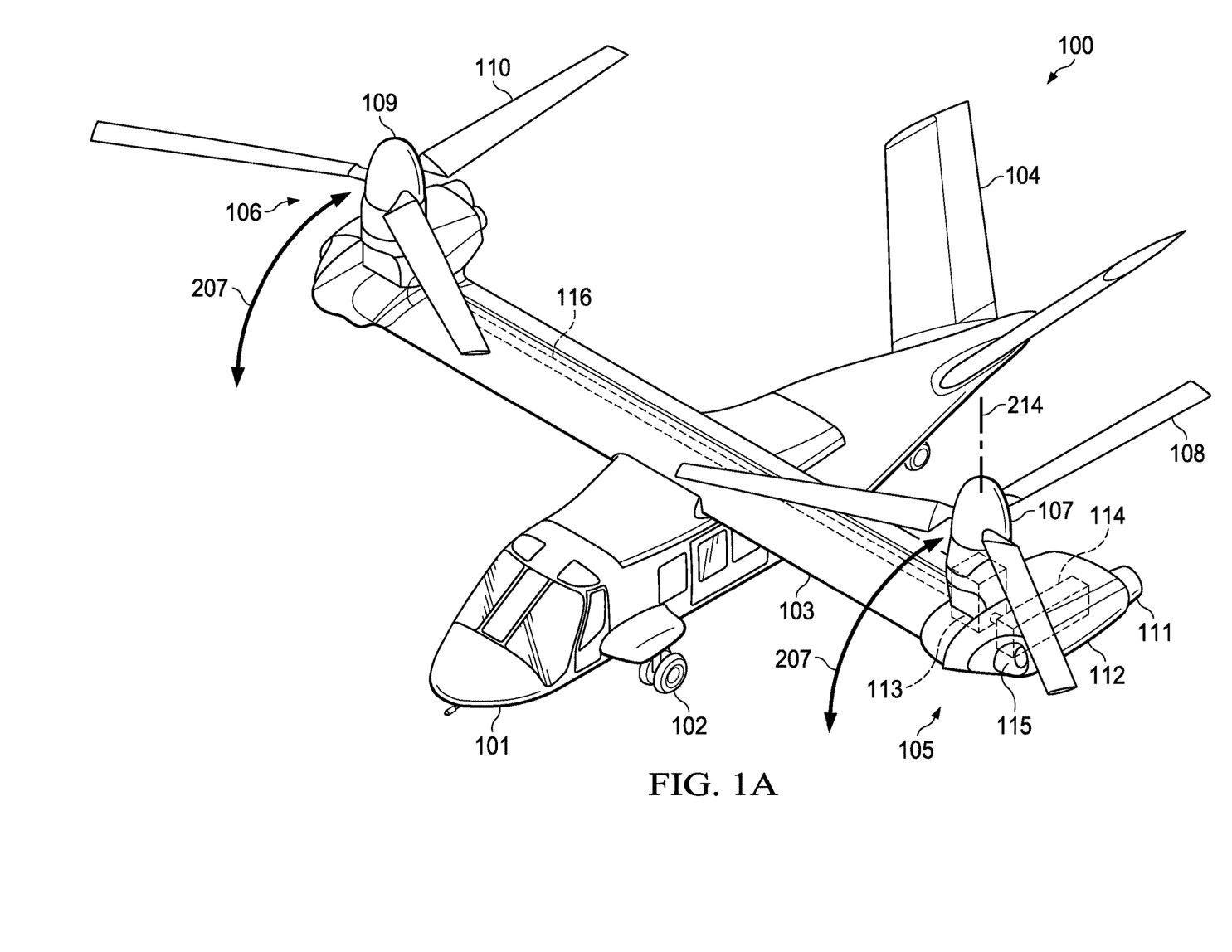
FIGS. 1A-1B illustrate perspective views of an example tiltrotor aircraft configured for different flight modes.
Figure 1B:
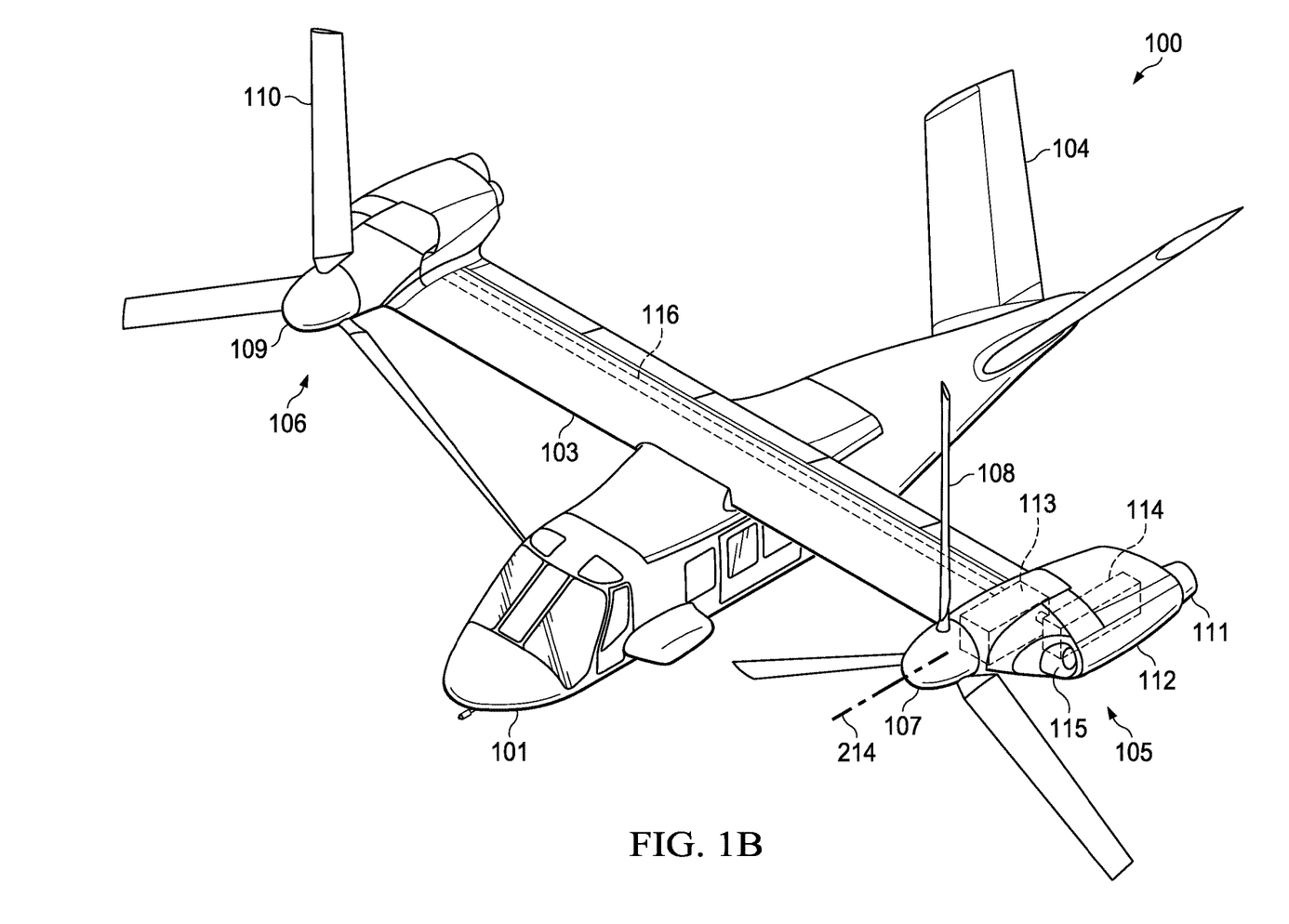

FIGS. 1A-1B illustrate perspective views of an example tiltrotor aircraft 100 configured for different flight modes. Tiltrotor aircraft 100 includes a fuselage 101, a landing gear 102, a wing 103, a tail member 104, a propulsion system 105, and a propulsion system 106. The fuselage 101 is the main body of the tiltrotor aircraft 100, which may include a cabin (e.g., for crew, passengers, and/or cargo) and/or may house certain mechanical and electrical components for tiltrotor aircraft 100. In the illustrated embodiment, tail member 104 may be used as a vertical and a horizontal stabilizer.

Propulsion system 105 includes a proprotor 107 that includes a plurality of rotor blades 108. Propulsion system 106 includes a proprotor 109 that includes a plurality of rotor blades 110. The position of proprotors 107 and 109, as well as the pitch of rotor blades 108 and 110, can be selectively controlled in order to provide flight capabilities (e.g., flight direction, thrust, and/or lift) for tiltrotor aircraft 100.

The position of proprotors 107 and 109 are moveable between a helicopter mode position and an airplane mode position to provide different types of thrust for tiltrotor aircraft 100. FIG. 1A illustrates tiltrotor aircraft 100 proprotors 107 and 109 in a helicopter mode position in which proprotors 107 and 109 are positioned substantially vertical to provide a lifting thrust. FIG. 1B illustrates tiltrotor aircraft 100 in an airplane mode position in which proprotors 107 and 109 are positioned substantially horizontal to provide a forward thrust in which a lifting force is supplied by wing 103. It should be appreciated that tiltrotor aircraft can be operated such that proprotors 107 and 109 can be selectively positioned between airplane mode and helicopter mode positions, which can be referred to as a "conversion mode."

Features of propulsion system 105 are substantially symmetric to features of propulsion system 106; therefore, for sake of efficiency certain features will be discussed only with regard to propulsion system 105. However, one of ordinary skill in the art would fully appreciate an understanding of propulsion system 106 based upon embodiments described herein for propulsion system 105.

Further, propulsion systems 105 and 106 are illustrated in the context of tiltrotor aircraft 100; however, propulsion systems 105 and 106 can be implemented on other tiltrotor aircraft. For example, an alternative embodiment may include a quad tiltrotor that has an additional wing member aft of wing 103 and the additional wing member may have additional propulsion systems similar to propulsion systems 105 and 106. In another embodiment, propulsion systems 105 and 106 can be used with an unmanned version of tiltrotor aircraft 100. Further, propulsion systems 105 and 106 can be integrated into a variety of tiltrotor aircraft configurations.

Various engines, gearboxes, and drive shafts may be provided in various configurations to provide torque to proprotors 107 and 109. For example, in at least one embodiment, propulsion system 105 may include an engine 111 within an engine nacelle 112. Engine 111 is mechanically coupled to a proprotor gearbox (PRGB) 113 via a fixed gearbox 114 to provide torque to proprotor 107 to facilitate various flight capabilities. In at least one embodiment, engine nacelle 112 may include an inlet 115, aerodynamic fairings, and exhaust, as well as other structures and systems to support and facilitate the operation of engine 111.

Fixed gearbox 114 may include various gears, such as helical gears, in a gear train that are mechanically coupled to engine 111 and proprotor gearbox 113 (via other gears and/or gearboxes), as well as an interconnect drive shaft (ICDS) 116. The interconnect drive shaft 116 may provide a torque path that enables a single engine to provide torque to both proprotors 107 and 109 in the event of a failure of the other engine.

Figure 2A:
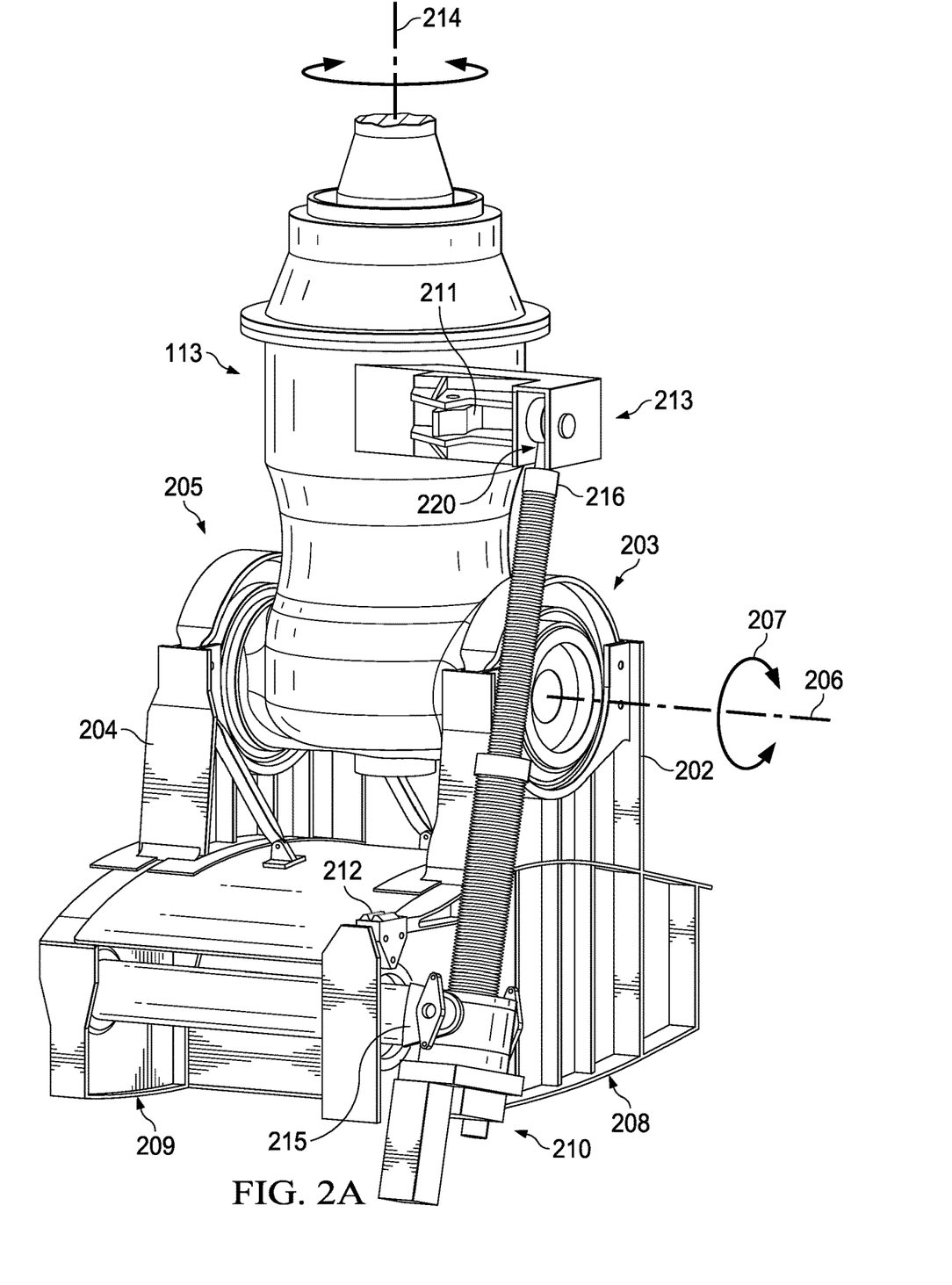
FIGS. 2A and 2B are partial perspective view diagrams illustrating example details associated with propulsion system in accordance with certain embodiments.
Figure 2B:
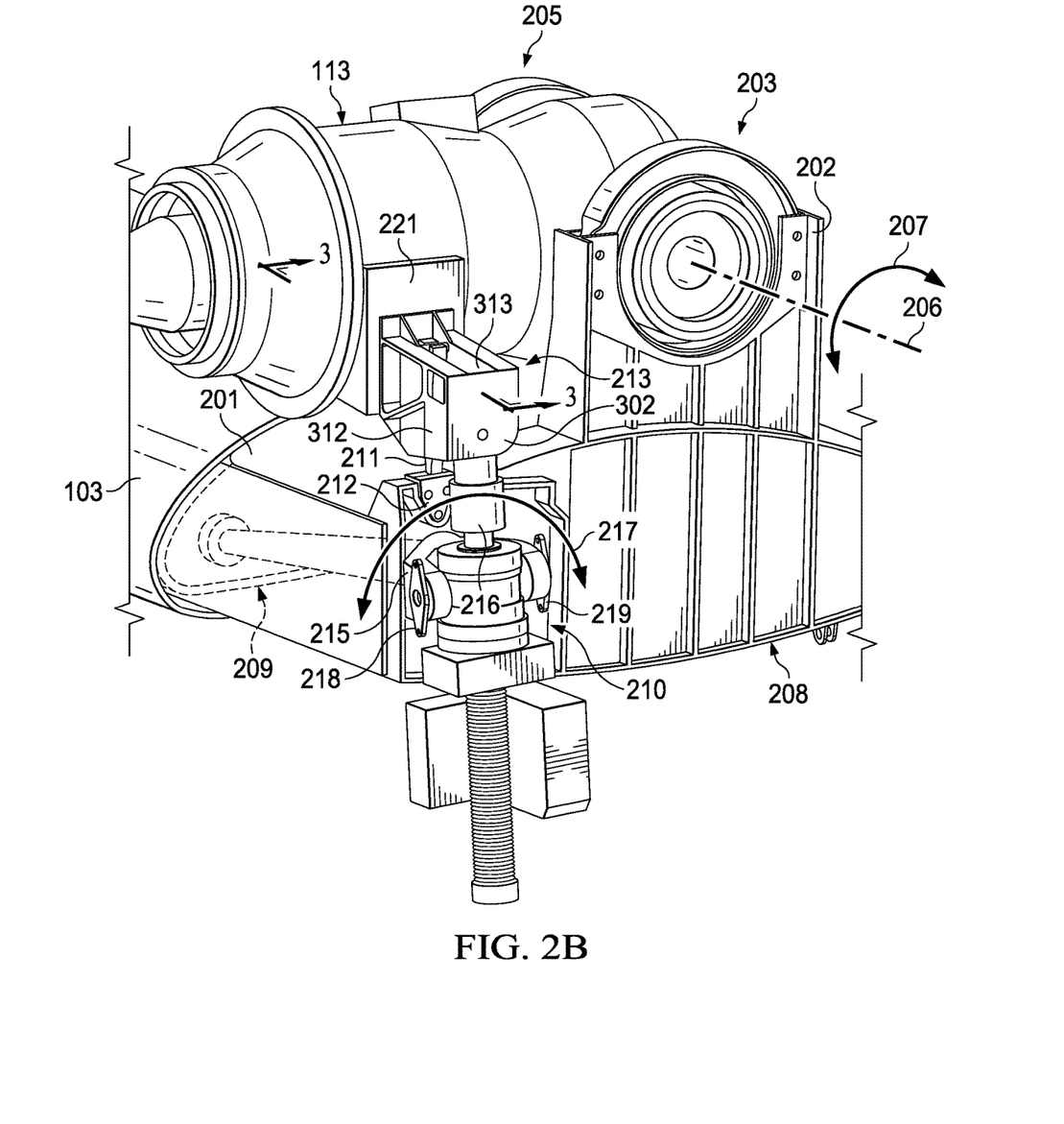

FIGS. 2A and 2B are partial perspective view diagrams illustrating example details associated with propulsion system 105, in accordance with certain embodiments. FIG. 2A illustrates example details associated with aircraft 100 when the proprotor gearbox 113 is positioned in helicopter mode corresponding to FIG. 1A, and FIG. 2B illustrates example details associated with aircraft 100 when the proprotor gearbox 113 is positioned in aircraft mode corresponding to FIG. 1B.

As discussed previously, propulsion system 105 includes engine 111 mechanically coupled to proprotor gearbox 113 via fixed gearbox 114 to provide various flight capabilities for tiltrotor aircraft 100. Engine 111 and fixed gearbox 114 are not shown in FIGS. 2A and 2B in order to illustrate other features of tiltrotor aircraft 100.

Proprotor gearbox 113 is located above an upper skin 201 of a portion of wing 103, while also being approximately centered between an inboard rib 209 and an outboard rib 208. In at least one embodiment, proprotor gearbox 113 may be mounted above upper skin 201 of wing 103 using an outboard pillow block 202, an outboard bearing assembly 203, an inboard pillow block 204, and an inboard bearing assembly 205. Thus, proprotor gearbox 113 is structurally supported but rotatable about a conversion axis (generally indicated by dashed-line 206) to allow the proprotor gearbox 113 to be rotated (generally indicated by arrows 207) between helicopter mode (as shown in FIG. 1A and FIG. 2A) and airplane mode positions (as shown at least in FIG. 1B and FIG. 2B).

In at least one embodiment, outboard pillow block 202 may be structurally integrated with and/or otherwise structurally coupled to outboard rib 208. In at least one embodiment, inboard pillow block 204 may be structurally integrated with and/or otherwise structurally coupled to inboard rib 209. It is to be understood that the structural configuration for mounting proprotor gearbox 113 to wing 103 is implementation specific and that any combination of structural components may be used for such mounting depending on applications and/or implementations.

Propulsion system 105 may include other components including, but not limited to, a conversion actuator 210 (sometimes referred to as a pylon conversion actuator (PCA)), a downstop striker 211, a downstop (or V-block or cradle assembly) 212, and downstop striker fitting 213. Propulsion system 105 may include other components as would be appreciated by one of ordinary skill in the art to facilitate flight capabilities for tiltrotor aircraft 100; however, such components are not disclosed for sake of brevity only in order to discuss various features relating to downstop striker fitting 213.

In accordance with some embodiments, downstop striker fitting 213 is not integrally formed into proprotor gearbox 113; rather, fitting 213 may be mounted on or otherwise attached to proprotor gearbox 113. Thus, downstop striker fitting 213 may be separate from any integrated casting features of proprotor gearbox 113. In the example illustrated in FIGS. 2A and 2B, fitting 213 also provides features for mechanically coupling conversion actuator 210 to the fitting 213; however, in other embodiments (e.g., FIGS. 4A and 4B), the downstop striker fitting may be separate from the coupling conversion actuator. In at least one embodiment, downstop striker 211 may be mounted to fitting 213 and downstop 212 may be mounted to an upper surface of outboard rib 208. In some embodiments, the arrangement of a downstop striker and downstop may be reversed. For example, in some embodiments, a downstop striker may be mounted to the wing and/or outboard rib 208 and a downstop or V-block may be mounted to or formed for fitting. This reversed arrangement offers an advantage of preventing debris collection in the downstop, which might prevent the downstop striker from seating correctly. In at least one embodiment, conversion actuator 210 may be a linear actuator, such as a telescoping ball screw; however, other conversion actuator types may be envisioned depending on applications and/or implementations.

During operation, conversion actuator 210 may be actuated (e.g., via a flight control system) so as to selectively rotate proprotor gearbox 113 about conversion axis 206 to selectively position proprotor 107 in airplane mode and helicopter mode positions. Propulsion system 105 may be subjected to various aerodynamic and operational forces during operation such as thrust or torque loads, conversion actuator pre-load forces, aerodynamic shears, and so forth. Thrust or torque loads, for example, are forces produced by the rotation of proprotor 107 about a mast axis (generally indicated by dashed line 214) that is collinear with the rotational center of proprotor 107. In another example, when in airplane mode, conversion actuator 210 may provide a downward pre-load force that maintains the position of proprotor 107 in airplane mode.

In yet another example, operational failures and/or malfunctions of components may result in unintended forces being caused to propulsion system components. For example, conversion actuator 210 may malfunction in a 'worst-case' scenario and rather than applying nominal pre-load forces, which typically range between 2,000 pounds and 10,000 pounds of downward force, the conversion actuator may drive the downstop striker 211 into the downstop 212 at forces potentially order(s) of magnitude greater than nominal.

Thus, it is important to provide structural and mechanical support for components of propulsion system 105 to facilitate flight capabilities for tiltrotor aircraft 100. Design of components that are used to provide structural and mechanical support for a propulsion system (e.g., propulsion system 105) can implicate numerous considerations (e.g., performance considerations, manufacturing considerations, etc.) such as weight, failure, "worst-case" damage or wear rate, cost, and part count among others, and can be a challenging aspect of tiltrotor aircraft design.

Downstop striker fitting 213 may provide various structural and mechanical features for propulsion system 105 in accordance with various embodiments described herein. In at least one embodiment, fitting 213 may facilitate mechanically coupling conversion actuator 210 to proprotor gearbox 113 to facilitate conversion mode positioning of proprotor gearbox 113 in helicopter mode and aircraft mode positions. In other embodiments, downstop striker fitting 213 may facilitate downstop 212/downstop striker 211 configurations in which the downstop 212 may be mounted to an upper surface of outboard rib 208 and downstop striker 211 may be mounted to fitting 213. In at least one embodiment, the configuration may provide for aligning downstop striker 211 and downstop 212 along both forward-to-aft and inboard-to-outboard directions to allow downstop striker 211 to be driven into and held downstop 212 (e.g., at a given pre-load force) when the proprotor 107 is positioned in airplane mode.

In accordance with embodiments described herein, downstop striker fitting 213 may provide numerous technical advantages over other potential conversion actuator coupling configurations and over other potential downstop/downstop striker configurations. For tiltrotor aircraft 100, conversion actuator 210 may be mounted to wing 103 at a location that is outboard of the proprotor gearbox mast axis 214 using a mounting assembly that is mechanically coupled to a spindle mount 215. Conversion actuator 210 may be mechanically coupled to fitting 213 using a rod-end socket-style upper attachment element 216 that is secured to fitting 213 using at least one fastener. In at least one embodiment, a spherical bearing 320 may be seated in the upper attachment element 216. As illustrated in FIG. 2B, the open area 220 allows the upper attachment element 216 to freely rotate through the open bottom and aft sides of the fitting 213 when proprotor gearbox 113 is positioned in a helicopter mode position.

Spindle mount 215 may be mounted to outboard rib 208 and inboard rib 209 using various bearing assemblies (not shown) that allow the spindle mount 215 and conversion actuator 210 to rotate along forward-to-aft directions (generally indicated by arrows 217) during operation. A lower mounting assembly may be mechanically coupled to spindle mount 215 using a forward bearing assembly 218 and an aft bearing assembly 219 that allow the conversion actuator 210 to tilt along inboard-to-outboard directions during operation.

Figure 4A:
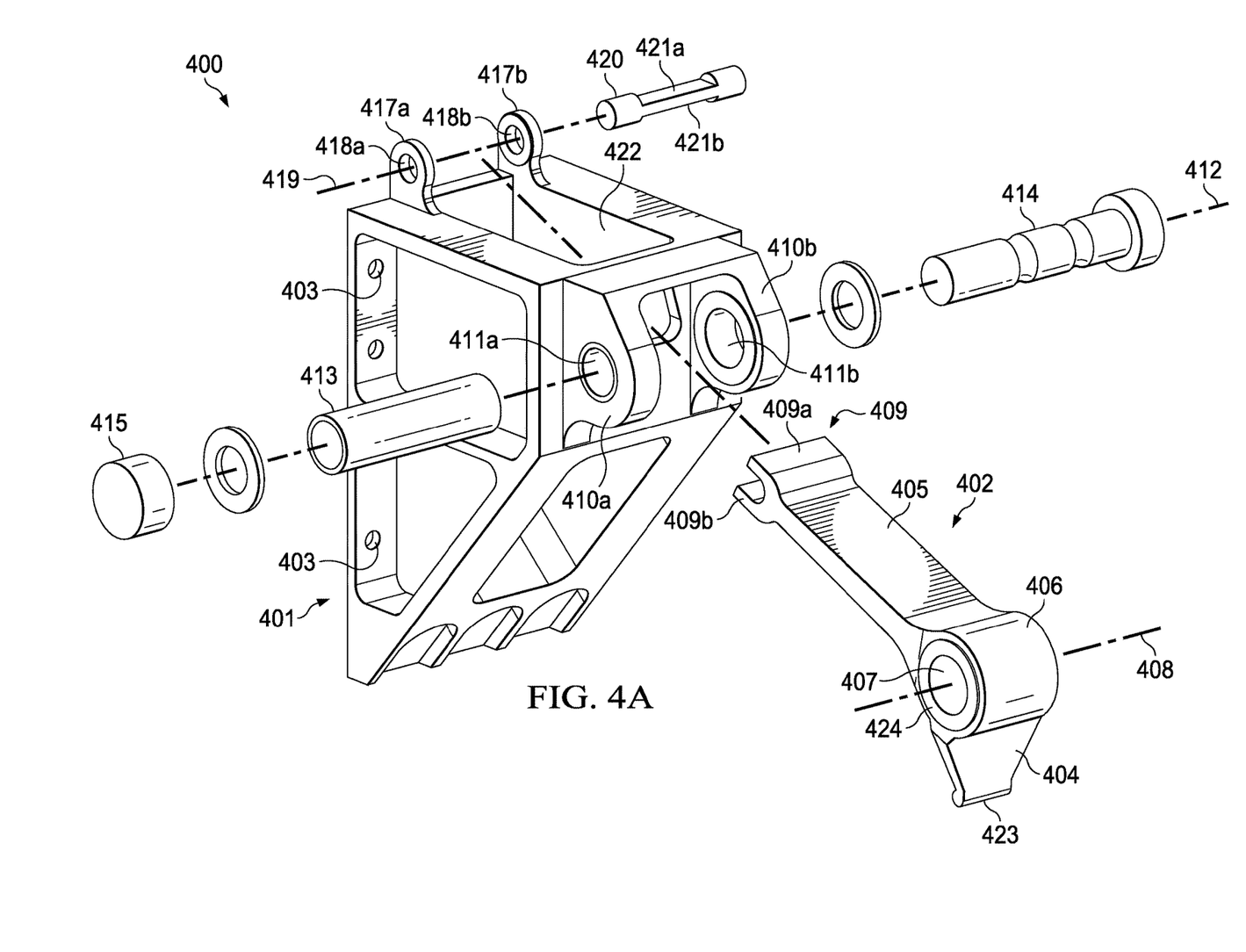
FIGS. 4A and 4B depict an alternative embodiment of a tiltrotor downstop striker fitting.
Figure 4B:
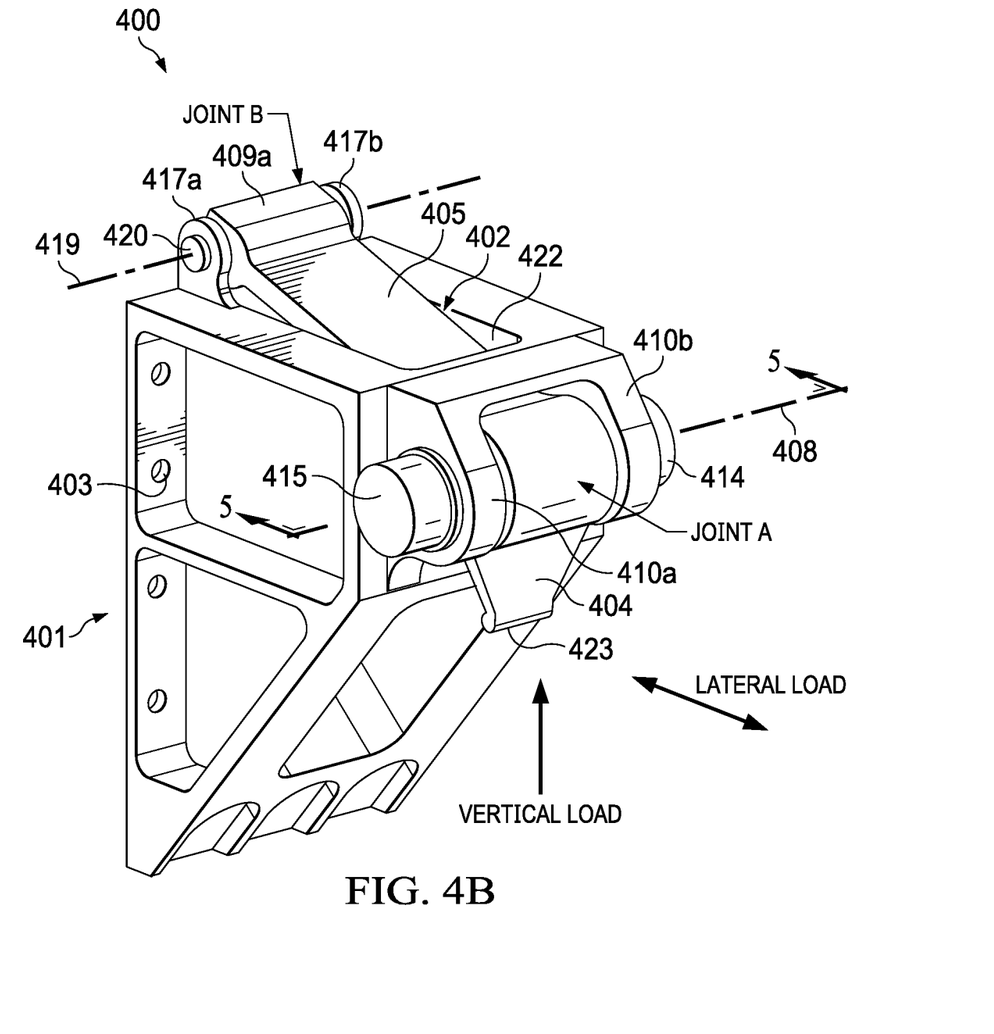

In other embodiments, the downstop 212/downstop striker 211 configuration using downstop striker fitting 213 may be replaced by other downstop/downstop striker configurations, such as the downstop striker 400 illustrated in FIGS. 4A and 4B. For example, some downstop/downstop striker configurations involve mounting a downstop along the forward side of the outboard rib 208. At least one advantage of the configuration provided by fitting 213 provides for driving pre-load forces directly into the outboard rib 208, which may not only eliminate cantilevered forces being driven along the forward side of the outboard rib but may also reduce part count and/or weight in comparison to other configurations.

Downstop striker fitting 213 may be mounted or otherwise attached to an attachment structure 221 that is integrated into proprotor gearbox 113 using, at least in part, a first inboard attachment portion 222 (FIG. 3) and a second inboard attachment portion 223 that may be integrally formed for the inboard side 224 of fitting 213. It is to be understood that the structural configuration attachment structure 221 is implementation specific and that any structure and/or structural components may be provided for an attachment structure of proprotor gearbox to facilitate mounting a conversion actuator/downstop striker fitting thereto depending on applications and/or implementations.

Accordingly, fitting 213 may provide various structural and/or mechanical features integrated together into a unitary component, which may provide numerous technical advantages over other conversion actuator mechanical coupling configurations and downstop/downstop striker configurations. Other advantages that may be provided by downstop striker 211 are discussed hereinbelow.

Figure 3:
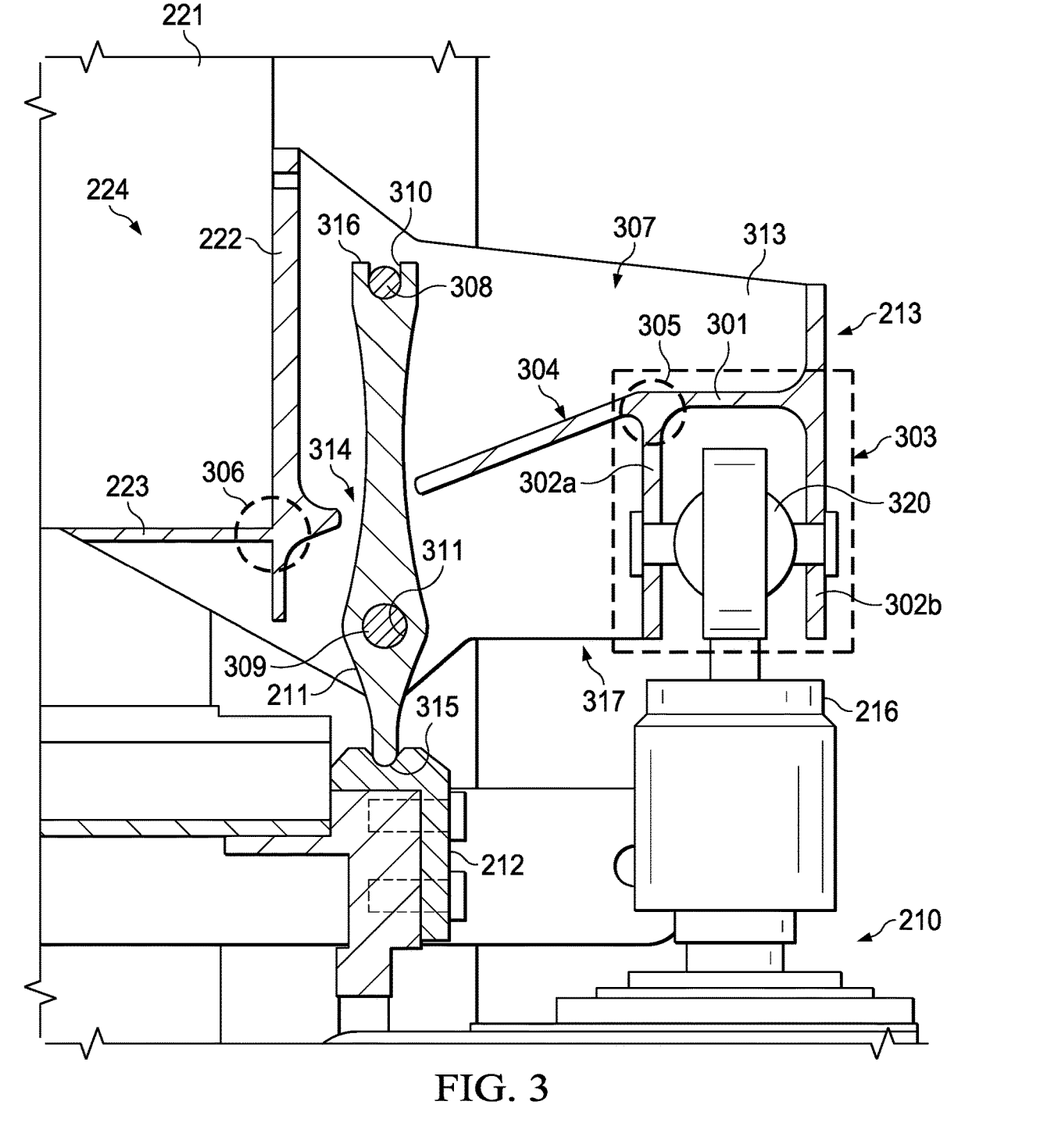
FIG. 3 is a simplified side, cross-sectional view diagram illustrating details of a downstop striker fitting.

FIG. 3 is a simplified side, cross-sectional view diagram (from a forward perspective) illustrating details associated with fitting 213. The cross-section of FIG. 3 is cut along a line as generally indicated by the lines labeled "3" in FIG. 2B. The enclosed top side 301 and the enclosed inner side 302a of the outboard connection portion 303 may meet and be structurally integrated together with a diagonal structural element 304 at an internal structural element 305 of the fitting 213. Spherical bearing 320 of the upper attachment element 216 is attached to the outboard connection portion 303 of fitting 213. Diagonal structural element 304 may extend between the internal structural element 305 and the cornered structural element 306.

Downstop striker 211 may be mounted to fitting 213 by mounting the striker 211 within the cavity 307 of fitting 213 and securing the striker 211 within the cavity 307 using at least two fasteners 308, 309 that each extend through corresponding holes (not labeled) provided in the forward side 312 and the aft side 313 of fitting 213. An upper fastener 308 may be inserted through the mounting slot 310 and a lower fastener 309 may be through the mounting hole 311 to secure the striker 211 within the cavity 307 of the fitting 213. In one embodiment, pin 309 may be a load pin as described herein. Load pin 309 would then be capable of directly measuring the downstop preload force. It will be understood that the position of the forward side 312 (FIG. 2B), aft side 313, and outer enclosed side 302b are implementation specific and may be adjusted based on the dimensions of the striker 211 and/or the dimensions of the fitting 213 depending on various applications and/or implementations.

Diagonal structural element 304 may include an opening 314 through which the striker 211 extends within the cavity 307 of the fitting 213. Downstop striker 211 may have a first end 315 and a second end 316 and may be mounted to fitting 213 in a vertical orientation in which the first end 315 represents the end of the striker 211 that is to be received by and in contact with downstop 212 when proprotor gearbox 113 is in the airplane mode position. The second end 316 of striker 211 may include a mounting slot 310 in which the slot extends through the striker 211. Striker 211 may also include a mounting hole 311 that extends through striker 211 between the first end 315 and the second end 316. The mounting hole 311 may be positioned to be closer to the bottom side 317 of the fitting 213 when the striker 211 is mounted within the fitting 213. It is to be understood that the position of the mounting slot 310 and the mounting hole 311 for the striker 211 are implementation specific and may be adjusted based on the dimensions of the striker 211 and/or the dimensions of the fitting 213 depending on various applications and/or implementations.

FIGS. 4A and 4B depict an alternative embodiment of a tiltrotor downstop striker fitting 400. A downstop striker fitting 400 includes a base member 401 configured to pivotally and slidingly receive an angled, tunable striker arm 402. Base member 401 is preferably made of aluminum but may be made of any other sufficiently rigid material. Base member 401 includes a plurality of mounting apertures 403 for mounting to pivoting proprotor component, such as gearbox 113. Striker arm 402 is generally L-shaped having a post portion 404 and a leg portion 405. Striker arm 402 is preferably made of titanium but may be made of other materials for which the mechanical properties, in particular bending stiffness, may be adjusted, or "tuned," by altering the geometrical dimensions of striker arm 402.

Post portion 404 and leg portion 405 of striker arm 402 intersect at a generally cylindrical corner portion 406. Corner portion 406 includes a cylindrical channel 407 that passes transversely through corner portion 406 along an axis 408. Bushings 424 are coupled to the interior of channel 407 to reduce friction during movement of striker arm 402. Leg portion 405 extends away from corner portion 406 and terminates at a forked end 409 having an upper fork 409a and a generally parallel lower fork 409b.

Base member 401 includes a plurality of tabs 410a and 410b. Tabs 410a and 410b are generally parallel and extend perpendicularly outward from base member 401. Tabs 410a and 410b include apertures 411a and 411b, respectively, passing therethrough. Apertures 411a and 411b are aligned along an axis 412. A slip bushing 413 is received by apertures 411a and 411b and channel 407. Slip bushing 413 is preferably an anti-friction bushing having a Teflon coating. Slip bushing 413 is held in place between tabs 410a and 410b, preferably by retaining washers. A pivot pin 414 passes along axis 412 through channel 407, bushings 424, slip bushing 413, and apertures 411a, 411b, and is releasably received by a fastener 415. In this manner, an anti-friction pivot Joint A (FIG. 4B) is created, about which post portion 404 and leg portion 405 pivot. In one embodiment, pin 414 may be a load pin as described herein. Load pin 414 would then be capable of directly measuring the downstop preload force.

Base member 401 includes a second plurality of tabs 417a and 417b. Tabs 417a and 417b are generally parallel and extend perpendicularly outward from base member 401. Tabs 417a and 417b include apertures 418a and 418b, respectively, passing therethrough. Apertures 418a and 418b are aligned along an axis 419. A retainer pin 420 is received through apertures 418a and 418b. Retainer pin 420 has a pair of flat recessed portions 421a and 421b disposed axially on opposing sides of retainer pin 420. It is preferred that at least recessed portions 421a and 421b of retainer pin 420 are coated with an anti-friction material, such as Teflon. Retainer pin 420 is free to rotate within tabs 417a and 417b about axis 419. Flat recessed portions 421a and 421b are configured to slidingly receive forks 409a and 409b, thereby forming a sliding and pivoting Joint B (FIG. 4B). Because forks 409a and 409b are allowed to slide relative to retainer pin 420, recessed portions 421a and 421b allow leg portion 405 of striker arm 402 to pivot about axis 412. However, leg portion 405 has sufficient stiffness to prevent forks 409a and 409b from translating enough relative to tabs 417a and 417b such that forks 409a and 409b release from retainer pin 420. In other words, the sliding connection of forks 409a and 409b with retainer pin 420 allows striker arm 402 to pivot about axis 412 and pivot pin 414 (i.e., Joint A).

As shown in FIG. 4B, striker arm 402 passes from Joint A to Joint B along a slot 422 in base member 401. Slot 422 allows leg portion 405 of striker arm 402 to remain in a generally horizontal position and flex or bend in a vertical plane without restriction. Slot 422 is configured to accommodate variations in the vertical thickness of leg portion 405. In addition, slot 422 allows downstop striker fitting 400 to maintain an overall low vertical height or profile. Although the terms "vertical" and "horizontal" are used herein, it should be understood that these terms are used only for ease of explanation and are not intended to be limiting as to the directions in which the present invention functions.

With downstop striker fitting 400 configured and assembled in this manner, oscillatory vibration loads, such as pitch loads and yaw loads, represented by the lateral loads and vertical loads indicated by arrows in FIG. 4B, generated by tiltrotor assemblies 105, 106 while in the airplane mode are transferred from tip portion 423 of post portion 404 to leg portion 405 and forks 409a and 409b. It should be understood that the lateral loads and vertical loads represented in FIG. 4B include dynamic loads generated during flight, such as when tiltrotor aircraft 100 goes into a dive or pulls up abruptly. Because post portion 404 is short, providing the low-height feature of the present invention, post portion 404 does not bend sufficiently to absorb or isolate the vertical and lateral loads. Thus, the vertical and lateral loads are transferred to leg portion 405 by post portion 404. As leg portion 405 bends, the vertical and lateral loads generated by tilt rotor assemblies 105 and 106 are isolated and absorbed, thereby preventing the vertical and lateral loads from being transferred to wings 103. Thus, wings 103 do not require additional structural support to absorb or dampen the oscillatory vibration loads.

In some embodiments, downstop striker fitting 400 may be used in place of downstop striker fitting 213. In such a configuration, tip portion 423 of striker arm 402 will engage downstop 212 or other V-block structure, when propulsion systems 105 and 106 are rotated forward to the aircraft mode configuration.

Figure 5:
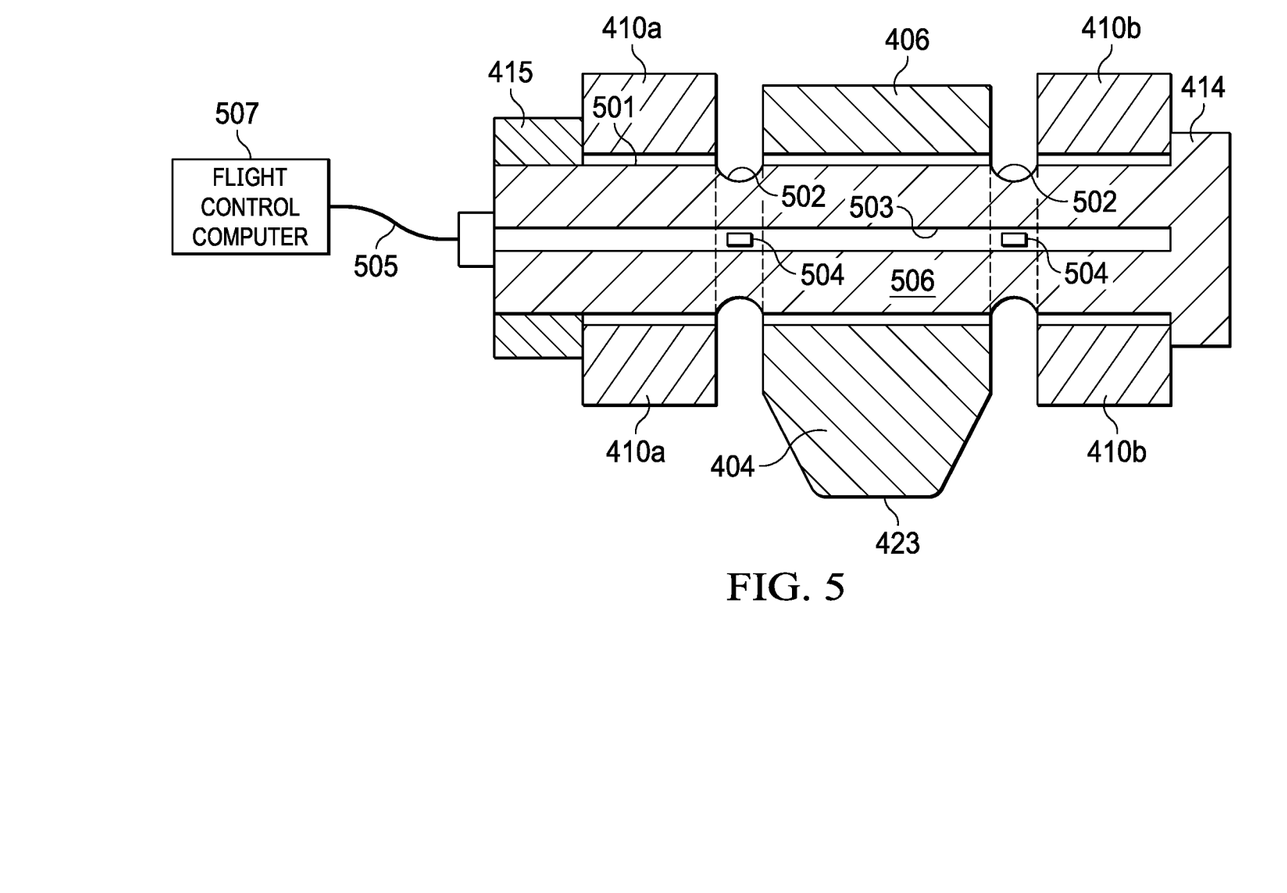
FIG. 5 is a cross-sectional view diagram illustrating details associated with the tiltrotor downstop striker of FIG. 4B.

FIG. 5 is a cross-sectional view diagram illustrating details associated with tiltrotor downstop striker fitting 400 of FIG. 4B. The cross-section of FIG. 5 is cut along a line as generally indicated by the lines labeled "5" in FIG. 4B. Certain features of FIGS. 4A and 4B, such as bushing 413 and washers, are not included in order to simplify the drawing. In one embodiment, pin 414 is a load pin that is fitted with internal strain gauges, which allows load pin 414 to the measured load at Joint A and to produce a proportional signal. The outer surface 501 of load pin 414 has two circular grooves 502 and an axial bore 503. Inside the central bore 503 and adjacent to the external grooves 502, force-measuring strain gauges 504 are mounted. Strain gauges 504 measure the force being applied to load pin 414. This force is represented by an electrical signal that is transmitted by load pin 414 on wire 505. Grooves 502 on the exterior circumference 501 of load pin 414 define the area 506 between the measured forces.

When operating in airplane mode, tip portion 423 of post 404 contacts a downstop or V-block, such as downstop 212. Post 404 applies force on the middle section 506 of load pin 414, while the fixed supports at tabs 410a and 410b apply pressure in the opposite direction. This is the force being measured by strain gauges 504 inside load pin 414. These preload force measurements are transmitted as an electrical signal via cable 505 to a flight control computer 507, sensor module, or other aircraft system. In other embodiments, the preload force measurements may be transmitted wirelessly from load pin 414 to flight control computer 507 or other systems. Flight control computer 507 may be, for example, a microprocessor-based device that executes software instructions to control and monitor the flight controls and aircraft systems, such as a conversion actuator.

Using integrated load pin 414 provides accurate and direct measurements of preload forces without impacting the configuration of the downstop striker fitting. Additionally, the incorporation of a replaceable load pin 414 simplifies the maintenance of the preload force sensors. Load pin 414 may also be used in the downstop striker fitting 213 as illustrated in FIG. 3, wherein fastener 309 in downstop striker 211 may be replaced by load pin 414 or similar device.

The electrical signal output from load pin 414 may be a DC voltage, AC voltage, or digital signal, for example, that is sent to flight control computer 507. The signal is processed in flight control computer 507 and compared to a pre-determined acceptable range, which is selected, for example, to ensure adequate preload between proprotors 107 and 109 and wing 103 to maintain aircraft stability. Flight control computer 507 also monitors the signal from load pin 414 to ensure that the structure is not overloaded. If the signal from load pin 414 indicates that the load between the downstop striker (e.g., 211 or 404) and the downstop or V-block (e.g., 212) is below a first pre-determined value required to maintain aircraft stability, then flight control computer 507 may send a warning signal to the pilot and an appropriate signal to the conversion actuator 210 to increase the force exerted by the downstop striker on the downstop. Likewise, if the signal from load pin 414 indicates that the preload between the downstop striker and the downstop is above a second pre-determined value necessary to maintain aircraft stability, then flight control computer 507 sends a warning signal to the pilot and an appropriate signal to conversion actuator 210 to decrease the force exerted by the downstop striker on the downstop. The first and second pre-determined values may be the same value or may be different values (e.g., for hysteresis).

Figure 6:
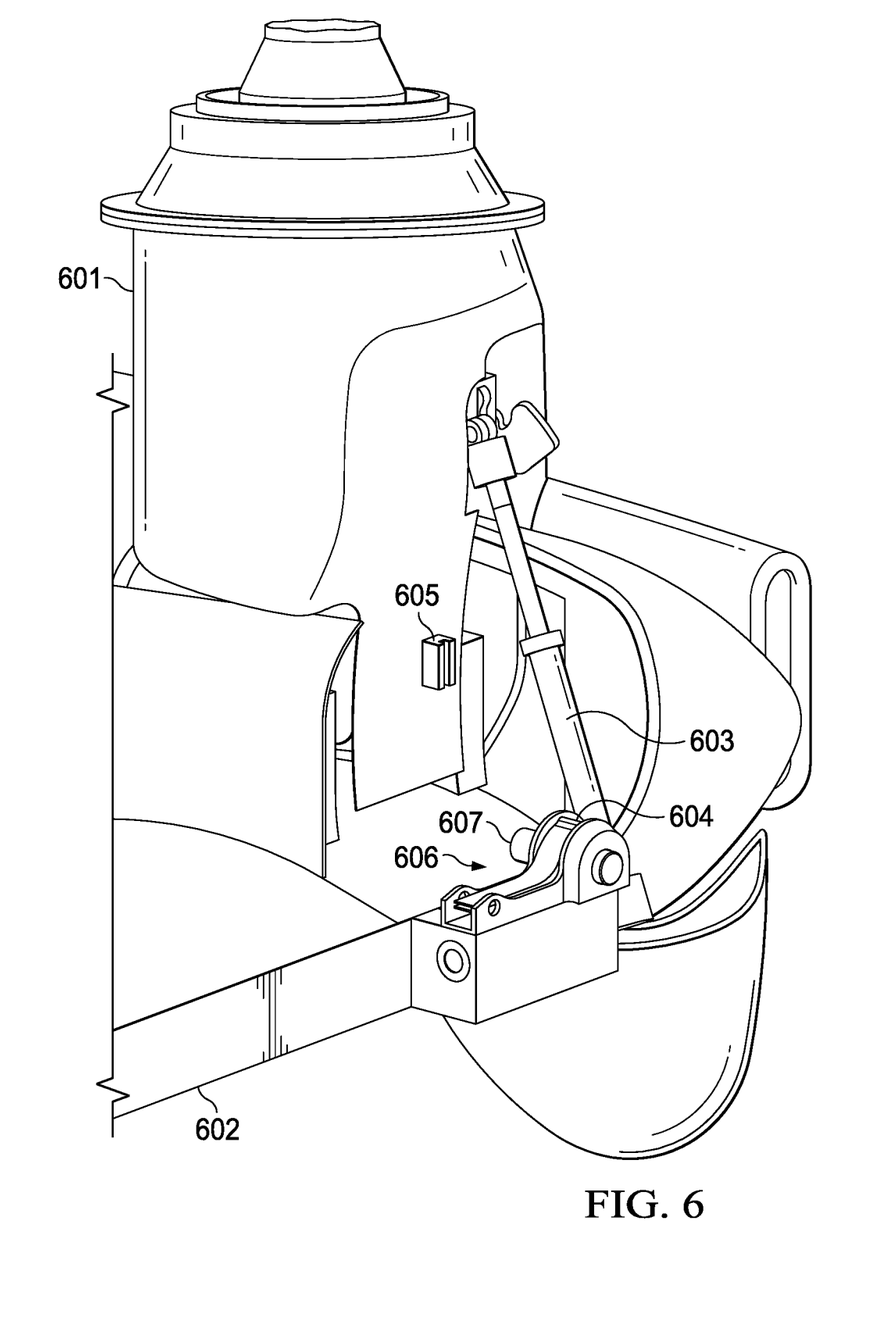
FIG. 6 depicts an alternate configuration for a downstop assembly.

FIG. 6 depicts an alternate configuration for a downstop assembly. A proprotor gearbox 601 is rotated between a horizontal position and a vertical position relative to wing 602 by an actuator 603. A downstop striker 604 is mounted on wing 602. A downstop 605 is mounted on the proprotor gearbox 601 and is configured to impact downstop striker 604 when proprotor gearbox 601 is rotated forward to the horizontal position. Downstop striker 604 is part of a downstop assembly 606, which includes a load pin 607.

Load pin 607 measures forces applied on downstop striker 604 by downstop 605. Forces between downstop striker 604 and downstop 605 are created by actuator 603 when proprotor gearbox 601 is rotated to the horizontal position. In one embodiment, load pin 414 (FIGS. 4A and 5) may be used as load pin 607 and may send a signal representing the measured force to a flight control computer, which determines if the desired preload has been applied by actuator 603.

FIGS. 2A and 2B illustrate a configuration in which the downstop 211 is mounted on the rotating proprotor gearbox and the downstop 212 is mounted on the wing, which is fixed relative to the proprotor gearbox. FIG. 6 illustrates an alternative configuration in which the downstop 605 is mounted on the rotating proprotor gearbox and the downstop striker is mounted on the wing. It will be understood that other variations in the positioning of the downstop and the downstop striker are also possible. For example, the position of the downstop and the downstop striker may be positioned directly in line with the rotating proprotor gearbox or may be offset inward or outward from the proprotor gearbox centerline.

Figure 7:
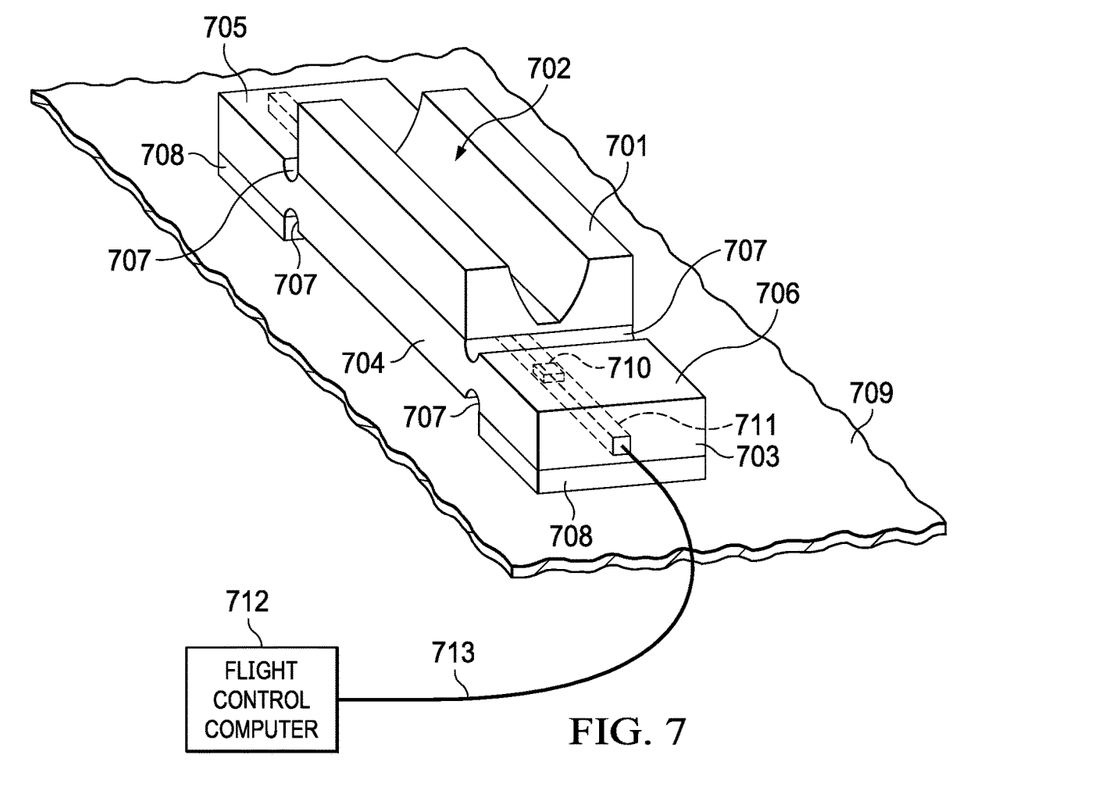
FIG. 7 depicts a downstop that incorporates a load cell to measure preload forces.

In further embodiments, instead of providing a load pin in the downstop striker assembly, a load cell may be incorporated into the downstop. FIG. 7 depicts a downstop 701. Downstop 701 comprises a channel 702 that is adapted to receive a downstop striker, such as striker 211 (FIG. 2A) or striker 604 (FIG. 6). Downstop 701 is mounted on load cell 703, which has a middle section 704 between end portions 705 and 706. Grooves 707 allow middle section 704 to flex relative to end portions 705 and 706. End portions 705 and 706 are mounted on pads 708, which provide space for middle section 704 to deflect slightly toward surface 709 when a downstop striker contacts downstop 701. Surface 709 may be, for example, a proprotor gearbox or an aircraft wing depending on how the downstop assembly is configured.

Internal strain gauges 710 are positioned within a central bore 711 of load cell 703. Strain gauges 710 measure forces being applied to load cell 703. The forces are represented by an electrical signal that is transmitted by load cell 703 to flight control computer 712 over wire 713. Alternatively, the signals from load cell 703 may be transmitted wirelessly. The signal output from load cell 703 may be a DC voltage, AC voltage, or digital signal.

When operating in airplane mode, a downstop striker contacts downstop 701 and applies force on the middle section 704 of load cell 703. Pads 708 on surface 709 apply pressure in the opposite direction. This force is measured by strain gauges 710 inside load cell 703. The flight control computer 712, a sensor module, or other aircraft system compares the forces from load cell 703 to the desired preload force and adjusts the proprotor actuator as appropriate to maintain the desired preload.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A tiltrotor aircraft, comprising:
   a wing;
   a proprotor pivotably mounted on the wing, the proprotor configured to move between a vertical position and horizontal position relative to the wing; and
   a downstop apparatus comprising a downstop striker, a downstop, and a load cell, the downstop striker and the downstop are positioned to be in contact only when the proprotor is in a horizontal position, the load cell comprising a body comprising a central bore and at least one sensor disposed in the central bore, the load cell configured to generate an output signal representing a force between the proprotor and the wing.

2. The tiltrotor aircraft of claim 1, wherein the downstop and the load cell are mounted on the proprotor and the downstop striker is mounted on the wing.

3. The tiltrotor aircraft of claim 1, wherein the downstop and the load cell are mounted on the wing and the downstop striker is mounted on the proprotor.

4. The tiltrotor aircraft of claim 1, wherein the load cell is a load pin, and the downstop striker is pivotably mounted on the proprotor using the load pin and the downstop is mounted on the wing.

5. The tiltrotor aircraft of claim 1, wherein the load cell is a load pin, and the downstop striker is pivotably mounted on the wing using the load pin and the downstop is mounted on the proprotor.

6. The tiltrotor aircraft of claim 1, further comprising:
a conversion actuator configured to move the proprotor between the horizontal position and the vertical position; and
a flight control computer coupled to the output signal from the load cell and configured to control the conversion actuator;
wherein the flight control computer is configured to cause the conversion actuator to increase the force if the force is less than a first selected preload value or to decrease the force if the force is greater than a second selected preload value.

7. The tiltrotor aircraft of claim 1, wherein the load cell is incorporated into the downstop.

8. The tiltrotor aircraft of claim 1, wherein the downstop is mounted on the load cell.

9. The tiltrotor aircraft of claim 1, wherein the load cell body comprises a middle section between end portions, and a groove defined in the body between the middle section and each end potion, configured to enable the middle section to flex relative to end portions.

10. The tiltrotor aircraft of claim 9, wherein, when the tiltrotor aircraft is operating in airplane mode, the downstop striker contacts the downstop and applies force on the middle section and the at least one sensor measures the force.

11. The tiltrotor aircraft of claim 9, wherein the end portions are mounted on pads, providing space for the middle section to deflect when the downstop striker contacts the downstop.

12. The tiltrotor aircraft of claim 11, wherein, when the tiltrotor aircraft is operating in airplane mode, the downstop striker contacts the downstop and applies force on the middle section, the pads support the end portions, and the at least one sensor measures the force.

13. The tiltrotor aircraft of claim 1, wherein the load cell is a load pin, and the downstop striker is pivotably mounted using the load pin, the load pin configured to directly measure downstop preload force.

14. The tiltrotor aircraft of claim 13, wherein the load pin comprises one or more circumferential grooves defined in an outer surface and the at least one sensors disposed adjacent to the at least one external groove, measuring force being applied to the load pin.

15. The tiltrotor aircraft of claim 13, wherein the load pin comprises a plurality of circumferential grooves defined in an outer surface and one of the at least one sensors disposed adjacent to each of the external grooves, measuring force being applied to the load pin.

16. The tiltrotor aircraft of claim 13, wherein the load pin comprises two circumferential grooves defined in an outer surface and the at least one sensors comprise a sensor disposed adjacent to each of the external grooves, measuring force being applied to the load pin.

17. The tiltrotor aircraft of claim 13, wherein:
the load pin comprises:
a first end portion;
a second end portion;
a middle section;
two circumferential grooves defined in an outer surface, one of the circumferential grooves defined between each end portion and the middle section; and
the at least one sensors comprising two sensors, one of the two sensors adjacent to each of the external grooves; each end section disposed
through a fixed support defined by the downstop striker; and
when the tiltrotor aircraft is operating in airplane mode the downstop striker contacts the downstop, applying force on the middle section, while the fixed supports support the end portions, the sensors measuring this force.

18. A tiltrotor aircraft downstop apparatus comprising:
a downstop striker;
a downstop, and
a load cell, the downstop striker and the downstop positioned to be in contact only when a proprotor of the tiltrotor aircraft is in a horizontal position, the load cell comprising a body having a central bore and at least one sensor disposed in the central bore, the at least one sensor configured to generate an output signal representing a force between the proprotor and a wing of the tiltrotor aircraft.

19. The tiltrotor aircraft downstop apparatus of claim 18, wherein:
the load cell body comprises a middle section between fixed end portions, and a groove defined in the body between the middle section and each end potion; and
the at least one sensor comprises a sensor disposed in the central bore adjacent each groove.

20. A tiltrotor aircraft downstop apparatus comprising:
a downstop striker;
a downstop, and
a load pin rotatably mounting the downstop striker, the downstop striker and the downstop positioned to be in contact only when a proprotor of the tiltrotor aircraft is in a horizontal position, the load pin comprising a body having an axial bore and at least one sensor disposed in the axial bore, the at least one sensor configured to generate an output signal representing a force between the proprotor and a wing of the tiltrotor aircraft.

21. The tiltrotor aircraft downstop apparatus of claim 20, wherein:
the load cell body comprises a middle section between fixed end portions, and a circumferential groove defined in the body between the middle section and each end potion; and
the at least one sensor comprises a sensor disposed in the axial bore adjacent each circumferential groove.

* * * * *